June 26, 1923.
J. S. MONROE
HAND TRUCK
Filed June 19, 1922
1,460,266
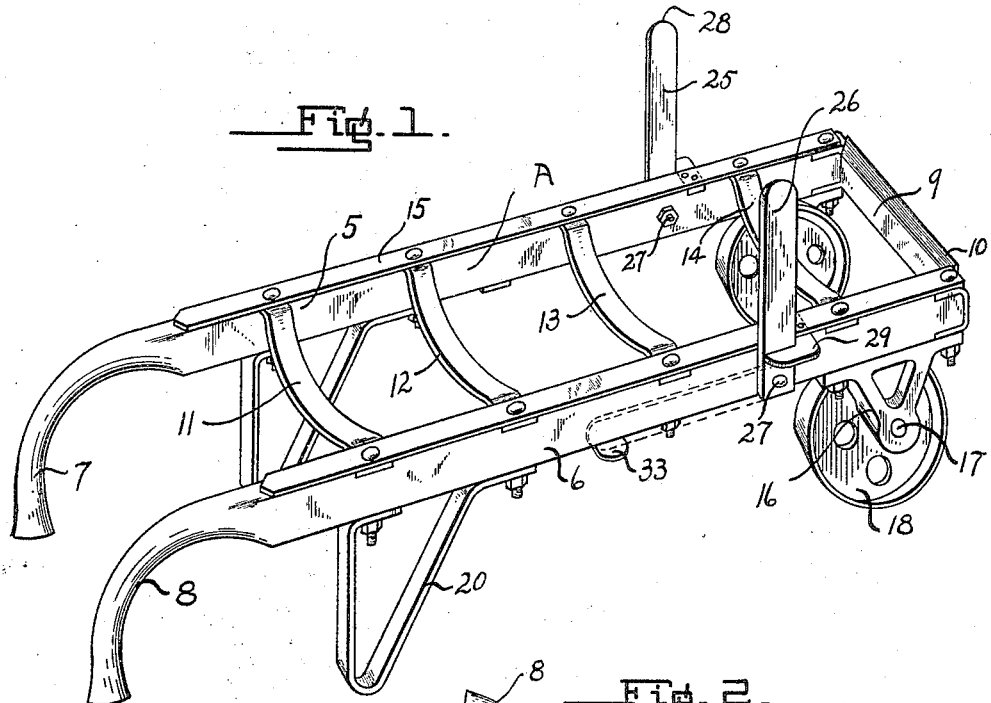
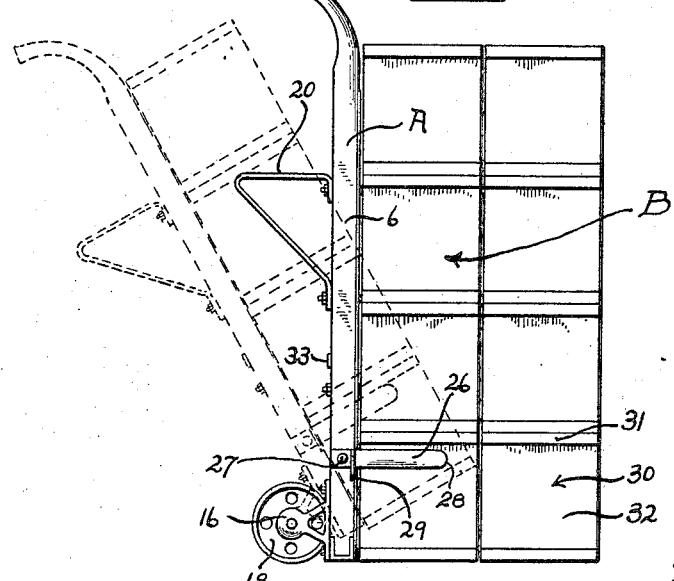
Inventor
John S. Monroe
By Lancaster and Allwine
Attorneys Patented June 26, 1923.

1,460,266

UNITED STATES PATENT OFFICE.

JOHN S. MONROE, OF MEMPHIS, MISSOURI.

HAND TRUCK.

Application filed June 19, 1922. Serial No. 569,397.

*To all whom it may concern:*

Be it known that I, JOHN S. MONROE, a citizen of the United States, residing at Memphis, in the county of Scotland and State of Missouri, have invented certain new and useful Improvements in Hand Trucks, of which the following is a specification.

This invention relates to hand trucks, and the primary object of the invention is to provide an improved hand truck which is particularly adaptable for handling egg crates, and which is so constructed that a plurality of crates can be lifted simultaneously thereby without the packing of the crates on the truck by hand.

Another object of the invention is the provision of a novel hand truck having arms connected to the side bars thereof and arranged to project outwardly from the side bars, the arms being so positioned upon the truck and of such a size and shape as to engage under the end cleats of an egg crate for effectively lifting the egg crate upon the truck without the necessity of lifting the egg crate upon the truck by hand.

A further object of the invention is the provision of means by which the egg crate engaged by the arms will be tilted to a slight extent inwardly toward the truck and thus permit egg crates, packed upon the lowermost egg crate to be lifted therewith and tilted inwardly on the truck.

A further object of the invention is to provide a novel hand truck which is particularly adaptable for carrying egg crates, but which is so constructed as to permit the use thereof for other purposes, the egg crate engaging arms being pivotally connected with the side bars of the truck so as to permit the same to swing downward into parallel engagement with the side bars, and thus permit the truck to be used for other purposes.

A still further object of the invention is to provide a novel hand truck of the above character which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings forming a part of this specification, in which drawings:

Figure 1 is a perspective view of the improved truck, and

Figure 2 is a side elevation of the improved truck showing the same in actual use and in position for engaging a plurality of egg crates.

Referring to the drawings in detail, wherein similar reference characters designate corresponding parts throughout the several views, the letter A indicates the improved truck which includes the spaced parallel side beams 5 and 6, the rear terminals of which may be curved downwardly to form handles 7 and 8 for facilitating the manipulation of the truck. The extreme forward ends of the beams can be connected by a cross bar 9, which can be secured to the forward terminals of the side beams 5 and 6 in any preferred manner. If desired, the upper edge of this front cross bar 9 can be sharpened as at 10 to facilitate the pushing of the cross bar under a barrel, box or the like. The side beams or bars 5 and 6 are connected at spaced points by cross pieces 11, 12, 13, and 14. These cross pieces 11, 12, 13 and 14 can be made of metal if so desired, and are of an arcuate configuration, so as to conform to the configuration of a barrel or the like when the same is being handled. Owing to the arcuate shape of the cross pieces 11, 12, 13 and 14, the same bow inwardly and thus their intermediate portions are positioned inwardly of the leading or sharpened edge 10 of the front cross member 9.

If so desired, the upper longitudinal faces of the side beams 5 and 6 can be provided with metal wear strips 15, which prevent injury to the side beams 5 and 6 by objects being carried thereby. The lower faces of the side beams 5 and 6 adjacent to the forward terminals thereof have secured thereto in any preferred manner, the depending wheel brackets 16, which support the axle or shaft 17, upon which is rotatably mounted the wheels 18. These wheel 18 are disposed in such relation to the front cross piece 9 that the said cross piece 9 will be permitted to lay flat upon the ground or other support when the hand truck is moved to its raised position as shown in Figure 2 of the drawings for engaging the objects to be carried such as egg crates.

Adjacent to the rear terminals of the side beams 5 and 6, depending metal feet 20 are secured thereto as in the usual construction of hand trucks.

As heretobefore stated, the hand truck is particularly adaptable for carrying egg crates and has been designed especially for that purpose. The means provided for permitting the convenient handling of egg crates, consists of a pair of arms 25 and 26 which can be made of any preferred material, such as steel, iron or the like. The inner terminals of these arms 25 and 26 are pivotally mounted upon bolts 27 carried by the side beams 5 and 6 of the truck. The outer terminals of the arms are preferably rounded as at 28 to form fulcrum points for engaging the egg crates to permit the egg crates to be conveniently tipped backward onto the side beams 5 and 6 of the truck. These arms 25 and 26 are particularly adapted for use upon hand trucks to accommodate the egg crates when laid on the truck with their lengths extending crosswise of the truck, but it will be apparent that the arms may be readily applied to hand trucks of various types and used equally as well for the handling of various other types of articles. In order to prevent swinging movement of the arms 25 and 26 toward the front cross piece 9, suitable stop brackets 29 are provided and arranged in the path of the arms. These stop brackets 29 hold the arms at right angles to the side beams 5 and 6, but do not hinder the said arms 25 and 26 from being swung downwardly in parallel relation to the bars 5 and 6 when the same are pushed toward the handles 7 and 8 of the said truck. In Figure 2 of the drawings is shown a plurality of egg crates B which are stacked one upon the other as in the usual practice. These egg crates are of standard construction and include the body portion 30 with the outstanding cleats 31 formed on the end walls 32 of the body 30. A great many of the egg crates used in shipping eggs are of the same standard construction and size and when the same are being packed in a railroad car for transportation the same generally are packed in tiers four high as shown in Figure 2 of the drawings. The arms 25 and 26 are secured to the side beams 5 and 6 at a distance from the front cross piece 9 of the truck equal to the distance of the upper cleats 31 from the lower edge or bottom of a crate, so that these arms 25 and 26 will be in correct position when the truck is turned on its end shown in Figure 2 of the drawings for engaging under the cleats 31 of the lowermost crate of a tier of crates. If desired, the arms 25 and 26 can be positioned as to lie just a little below the cleats 31 when the truck is turned on the end, so as not to hinder the slipping of the arms under the cleats as shown in Figure 2 of the drawings. The arms 25 and 26 are of such a length as to normally extend beyond the longitudinal center of an egg crate so that the forward terminals of the arms will engage the cleats 31 at the ends of the crate forwardly of the longitudinal center thereof and thus permit the egg crates when lifted by the arms 25 and 26 to swing in toward the truck, and thus absolutely preclude the possibility of the egg crates swinging outwardly and away from the truck.

In use of the truck, when egg crates are being handled, the truck is turned upon its end as shown in Figure 2 of the drawings and moved forwardly until the bars 5 and 6 are moved into relatively close contact with the crates B and the arms 25 and 26 lie below the cleats 31 thereof. The truck is then tilted rearwardly in the ordinary manner and the rounded terminals 28 of the arms 25 and 26 will engage under the cleats and tend to lift up the egg crates and move the same on to the side bars 5 and 6. While I have shown a truck handling a tier of four egg crates, it is to be understood that one or more egg crates may be handled at a time if so desired. The depositing of the egg crates, after being transported by the hand truck, is accomplished in the same manner as described for lifting and engaging the egg crates. It can be seen that the handles 7 and 8 are merely lifted upwardly to move the hand truck to a horizontal position which will permit the convenient depositing of the crates. The arms 25 and 26 of course support the crates while the truck is being moved to a horizontal position and will effectively prevent the tilting of the crates outward and away from the truck during the depositing of the crates and the moving of the truck to a horizontal position. After the truck has been moved to its horizontal position, the crates will be deposited upon the ground or other support, and it is then merely necessary to move the truck rearwardly and away from the crates.

When other articles are being handled, such as ordinary boxes, barrels or the like, the arms 25 and 26 can be swung rearwardly as heretobefore stated, and in order to prevent these arms from being swung below the bars 5 and 6, the bars 5 and 6 are provided with outwardly extending plates 33 which lie in the path of the arms 25 and 26 and effectively support the same in parallel relation to the side bars 5 and 6.

Owing to the fact that the cross pieces 11, 12, 13, and 14 are bowed inwardly, as heretobefore stated, the forward edge of a box will be permitted to be conveniently engaged by the front piece 9 which will prevent the slipping of the box, barrel or the like being handled off of the truck.

Changes in detail may be made without departing from the spirit or scope of this invention; but,

I claim:

1. The combination with a truck including side beams, of arms secured to said side beams and arranged in opposed relation, said arms being normally disposed at substantially right angles to the side beams, stop members on the side beams to be engaged by the arms when in normal position to prevent movement of the arms in one direction, said arms being adapted to be disposed parallel with the side beams when not in use, additional stop members on the side beams and in spaced relation with the first stop members to support the arms parallel with the side beams and rounded terminals on said arms disposed in the plane of the faces of the arms.

2. In a hand truck particularly adapted for transporting egg crates, a pair of spaced parallel side beams, handles formed on the rear terminals of the side beams, transversely extending cross pieces connecting the side beams together, wheels secured to the side beams adjacent to the forward terminals thereof and arranged to permit the forward terminals of the side beams to engage the ground when the truck is moved upon its end, outwardly extending arms having rounded terminals secured to the side beams and spaced from the forward terminals of the side beams a distance equal to the distance of the side cleats of an egg crate from the bottom wall thereof, said arms having such a length as to permit the outer terminals of the arms to engage the cleats of an egg crate at a point in advance of the longitudinal center thereof.

JOHN S. MONROE.